United States Patent
Söhnen et al.

(10) Patent No.: US 6,822,043 B2
(45) Date of Patent: Nov. 23, 2004

(54) RUBBER COMPOSITION

(75) Inventors: Dietmar Söhnen, Lauenau (DE); Richard Russell, Eynatten (BE)

(73) Assignee: Continental Aktiengesellschaft, Hannover (DE)

( * ) Notice: Subject to any disclaimer, the term of this patent is extended or adjusted under 35 U.S.C. 154(b) by 456 days.

(21) Appl. No.: 09/909,899

(22) Filed: Jul. 23, 2001

(65) Prior Publication Data

US 2002/0045697 A1 Apr. 18, 2002

(30) Foreign Application Priority Data

Jul. 24, 2000 (EP) .............................. 00115852

(51) Int. Cl.⁷ .................................. C08K 3/34
(52) U.S. Cl. ...................... 524/592; 524/476; 524/481; 524/495
(58) Field of Search ................ 524/492, 495, 524/476, 481

(56) References Cited

U.S. PATENT DOCUMENTS

| | | | |
|---|---|---|---|
| 5,252,649 A | | 10/1993 | Hausmann |
| 5,504,135 A | * | 4/1996 | Ardrizzi et al. ............. 524/484 |
| 5,905,112 A | | 5/1999 | Hellermann |
| 6,300,416 B1 | * | 10/2001 | Okada et al. ................ 525/191 |
| 6,333,375 B1 | * | 12/2001 | Nakamura et al. .......... 524/394 |

FOREIGN PATENT DOCUMENTS

| | | |
|---|---|---|
| DE | 3941246 | 6/1991 |
| EP | 0524164 | 1/1993 |
| EP | 0708137 | 4/1996 |
| EP | 0799726 | 10/1997 |
| EP | 0831123 | 3/1998 |
| EP | 0940462 | 9/1999 |
| GB | 2239870 | 7/1991 |

OTHER PUBLICATIONS

English Language Abstract of EP 0 708 137.
J. Schnetger, Dictionary of Rubber Technology [Lexikon der Kautschuk–Technik], Hüthig Buch Verlag, 2$^{nd}$ Edition, Heidelberg, 1991.
V. Null, "Safe Process Oils for Tires with Low Environmental Impact", Kautschuk Gummi Kunstsoffe, Dec. 1999, S. 799–805.

\* cited by examiner

*Primary Examiner*—Edward J. Cain
(74) *Attorney, Agent, or Firm*—Greenblum & Bernstein, P.L.C.

(57) ABSTRACT

Sulfur vulcanizable rubber composition which does not contain aromatic process oils including at least one diene elastomer, at least finely dispersed, precipitated silica and carbon as fillers, softeners, at least one silane coupling agent, and additional common additives as well as a process for their production. Additionally, the invention relates to rubber products and tires made based on such rubber compositions. The rubber composition can comprise 5 to 60 phr of at least one mineral oil softener as a softener, with a content of polycyclic aromatic compositions of less than 3 wt-% in relation to the total weight of the mineral oil softener, determined by the DMSO extract according to the IP 346 method, and a glass transition temperature below −45° C., and 1 to 20 phr of at least one glyceride and/or of a factice, and the weight ratio of finely dispersed, precipitated silica to carbon black being 1:2 to 20:1 in the rubber composition.

21 Claims, No Drawings

RUBBER COMPOSITION

CROSS-REFERENCE TO RELATED APPLICATIONS

The present application claims priority under 35 U.S.C. § 119 of European Patent Application No. 00115852.6, filed Jul. 24, 2000, the disclosure of which is expressly incorporated by reference herein in its entirety.

BACKGROUND OF THE INVENTION

1. Field of the Invention

The present invention relates to a sulfur vulcanizable rubber composition which does not contain aromatic process oils. The rubber composition can contain at least a diene elastomer, at least finely dispersed, precipitated silica and carbon black as fillers, softeners, at least one silane coupling agent, and other common additives. Additionally, the present invention relates to a process for producing the rubber composition, and to rubber products and tires made on the basis of this rubber composition.

2. Discussion of Background Information

It is known to add softeners to natural and synthetic rubbers and their rubber compositions in order to lower their viscosity and to improve their processability. For this purpose, preferably commercial products in the form of aromatic petroleum raffinates (aromatic process oils) can be used. Such aromatic oils allow, on the one hand, the improvement of the processability of the highly viscous, uncured components of the compound, due to their effect of lowering viscosity and/or hardness, and, on the other hand, they reduce the hardness, the stress value in the stress test (module) and the elasticity of the vulcanization products. However, aromatic process oils have the disadvantageous feature of leaving more or less extensive brown to black, sometimes oily, stains on the surface after extended contact with the surfaces of other objects, such as, e.g., floors. Such stains can be discerned, e.g., at tire storage facilities, conveyor belts, driving belts, seals, tubes, shoe soles, and other rubber products. Such stains can hardly be removed.

Additionally, vulcanization products with aromatic process oils generally contain carbon black as a filler, and have the disadvantage that they leave black marks on objects by friction with the surfaces, such as those that are clearly discernible on the landing strips of airports caused by the wear of airplane tires.

In order to produce non-staining vulcanization products whose physical characteristics are not influenced by softeners used, DE 39 41 246 A1 and its family member GB 2,239,870, which are incorporated by reference herein in their entireties, suggest using softeners for rubber compositions containing carbon black that are selected from esters (e.g., dioctylphthalate), naphthenic oils, paraffinic oils, or their mixtures, and furthermore adding a liquid polymer (e.g., liquid polyisoprene) and/or asphaltenes. However, these vulcanisates still have the disadvantage of leaving black markings on the surfaces due to friction. Additionally, problems in processing arise in such rubber compositions. The specific components of the compound cannot easily be homogeneously mixed, and oily perspiration is discernible on the vulcanized products.

EP 0 708 137 A1, which is incorporated by reference herein in its entirety, describes vulcanized products said to lack the disadvantage of leaving black markings by friction and dark discolorations of surfaces due to an extended contact of the vulcanized products with such surfaces. For this purpose, it is suggested for the rubber composition not to contain any aromatic process oils, but to be provided with at least one softener (e.g., dioctylphthalate), liquid polymer, and/or asphaltenes, and, as fillers, silica and carbon black in the volume ratio of 1:1 to 20:1. This rubber composition has processing problems as well in that a completely homogenous mixing is hardly achievable, and a perspiration is also discernible at the vulcanization here as well. Additionally, ecological and/or health concerns are suspected for phthalate softeners. Furthermore, the liquid polymers suggested in EP 0 708 137 A1 are presently expensive and hardly available in sufficient amounts. At present, few types of polymers are available in a liquid form, e.g., polyisoprene.

SUMMARY OF THE INVENTION

The present invention provides a sulfur vulcanizable rubber composition that is easily processed, and mixed, and which does not have the disadvantage of leaving black markings due to friction and dark discolorations on surfaces due to an extended contact of the vulcanisate with such surfaces. Additionally, the vulcanization products (rubber products), e.g., tires with a tread made from this compound, do not have disadvantageous effects on their physical characteristics, especially when compared to the products made from known rubber compositions.

The objects according to the present invention can be attained in a sulfur vulcanizable rubber composition which does not contain aromatic process oils that has, as a softener 5 to 60 phr of at least one mineral oil softener having a content of polycyclic aromatic compositions of less than 3 wt-%, determined with the DMSO (Dimethylsulfoxide) extract according to the IP 346 method, with respect to the total weight of the mineral oil softener, and a glass transition temperature below −45° C., and contains 1 to 20 phr of at least one of at least one glyceride and/or factice, and has a weight ratio of finely dispersed, precipitated silica to carbon black of 1:2 to 20:1.

Thus, the present invention is directed to a sulfur vulcanizable rubber composition which does not contain aromatic process oils, comprising at least one diene elastomer; at least finely dispersed, precipitated silica and carbon black as fillers, said finely dispersed, precipitated silica and said carbon black being present in a weight ratio of silica to carbon black of 1:2 to 20:1; softeners including 5 to 60 phr of at least one mineral oil softener, comprising a content of polycyclic aromatic compositions of less than 3 wt-% in reference to the total weight of the at least one mineral oil softener, determined by DMSO extract according to IP 346 method, and a glass transition temperature less than −45° C., and 1–20 phr of at least one of at least one glyceride and at least one factice; and at least one silane coupling agent.

The invention is also directed to a process for producing a sulfur vulcanizable rubber composition which does not contain aromatic process oils, the rubber composition comprising at least one diene elastomer; at least finely dispersed, precipitated silica and carbon black as fillers, the finely dispersed, precipitated silica and the carbon black being present in a weight ratio of silica to carbon black of 1:2 to 20:1; softeners including 5 to 60 phr of at least one mineral oil softener, comprising a content of polycyclic aromatic compositions of less than 3 wt-% in reference to the total weight of the at least one mineral oil softener, determined by DMSO extract according to IP 346 method, and a glass transition temperature less than −45° C., and 1-20 phr of at least one of at least one glyceride and at least one factice; and at least one silane coupling agent; the process comprising (a) mixing the at least one diene elastomer, the finely dispersed, precipitated silica, the carbon black, the at least one mineral oil softener, and the at least one of at least one glyceride and at least one factice, and the at least one silane coupling agent, in the absence of a vulcanization system; and, simultaneously, heating the composition to a temperature of up to 180° C.; and (b) adding and mixing a vulcanization system at a temperature below the vulcanization temperature. The mixing of (a) can include at least one heating and cooling cycle.

The at least one glyceride can comprise rapeseed oil.

The at least one diene elastomer can be selected from at least one of natural rubber, synthetic polyisoprene, polybutadiene, and styrene-butadiene-copolymers.

The weight ratio of finely dispersed, precipitated silica to carbon black can be 1:1 to 20:1.

The finely dispersed silica can have a nitrogen surface of 35 to 350 m$^2$/g and a pore volume of 0.2 to 3.4 mL/g.

The at least one silane coupling agent can be present in an amount of 0.2 to 30 parts per weight in relation to 100 parts per weight of silica.

The rubber composition can comprise 10 to 80 phr silica and 1 to 60 phr carbon black.

The invention is also directed to a rubber product composed of the rubber composition vulcanized with sulfur. The rubber product can comprise a tread strip of a tire, or a tire including a tread strip, with the tire being at least partially composed of a rubber composition according to the invention vulcanized with sulfur. Moreover, the tread strip can be at least partially composed of the rubber composition.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description making apparent to those skilled in the art how the several forms of the present invention may be embodied in practice.

The specification phr (parts per hundred parts of rubber by weight) used in this document is the common specification of amounts for compounds in the rubber industry. Here, the dosage of the weight parts of the separate substances is always related to 100 parts by weight of the total rubber mass.

Aromatic process oils are considered mineral oil softeners containing, according to ASTM D 2140, more than 25 wt %, preferably more than 35 wt %, aromatic components ($C_A$), less than 45 wt % naphthenic ($C_N$), and less than 45 wt % paraffinic ($C_P$) components. The constant viscosity-density, according to ASTM D 2140 (VDK), of aromatic process oils exceeds 0.9. Furthermore, the aromatic process oils according to ASTM D 2226 are classified in the oil type 101 and 102.

Polycyclic aromatic compositions include aromatic hydrocarbons having more than three condensed aromatic rings, and the heterocyclic compositions with sulfur and/or nitrogen derived therefrom. The rings can be substituted with short alkyl groups or cycloalkyl groups.

Factices are products of transformations and/or cross-links of unsaturated animal, vegetable, or synthetic oils (e.g., rapeseed or castor oil) with sulfur, hydrogen sulfide, disulfide chloride, silicon tetrachloride, or diisocyanate. For additional details, reference is made, for example, to J. Schnetger, Dictionary of Rubber Technology [Lexikon der Kautschuk-Technik], Hüthig Buch Verlag, $2^{nd}$ Edition, Heidelberg, 1991, which is incorporated by reference herein in its entirety.

Surprisingly, it has been shown that such combinations of the special mineral oil softener with glyceride and/or factice and the ratio of the silica to carbon black in rubber compositions that can be cross-linked with sulphur can be processed and mixed in a problem-free manner without aromatic process oils and, simultaneously, the vulcanized products of such compounds do not show any stain formation or undesired markings caused by friction. Moreover, the physical characteristics of the vulcanized rubber and/or vulcanization products are not negatively influenced and, to an extent, they are even considerably improved. Improvements are discernible in tires whose tread contains the vulcanized rubber composition, e.g., in rolling resistance, winter characteristics, grip on wet roads, and braking on dry roads. Surprisingly, using the special combination of mineral oil softeners with glycerides and/or factices according to the invention and the ratio of silica to carbon black, the disadvantageous reduction in the grip on wet roads due to the use of an oil having a low glass transition temperature, as commonly corresponding to the lowering of the glass transition temperature of the compound, does not occur. Moreover, the other positive characteristics resulting from a low glass transition temperature of the compounds, such as, for example, low rolling resistance, good winter characteristics, and good braking on dry roads (with or without ABS), still remain or are even improved.

Additionally, the softeners used offer the advantage, compared to phthalate softeners, that they cause no environmental or health concerns. Additionally, they are commercially available.

It is disadvantageous for the compound to contain more than 20 phr glyceride and/or factice, because incompatibilities can occur between the glyceride and/or the factice and the rubber.

Generally, all mineral oil softeners can be used that are known to one skilled in the art, fulfilling the criteria of mineral oil softeners with a content of polycyclic aromatic compositions (PCA—content) of less than 3 wt % with relation to the total weight of the mineral oil softener, determined by the DMSO-extract according to the IP 346 method, and have a glass transition temperature below −45° C. Such mineral oil softeners are, e.g., MES (mild extraction solvate), produced by solvent extraction of heavy oil distillates or by treating heavy oil distillates with hydrogen in the presence of catalysts (hydration) and which are preferably used in the rubber composition according to the invention due to its presently higher availability, or TDAE (treated distillate aromatic extract). With regard to these mineral oil softeners, V. Null, "Safe Process Oils for Tires with Low Environmental Impact", Kautschuk Gummi Kunststoffe, 12/1999, S. 799–805, the disclosure of which is incorporated by reference herein in its entirety, is listed as an exemplary reference in that connection. The use of such mineral oil softeners in rubber compositions is also known, for example, from EP 0 940 462 A2, which is incorporated by reference herein in its entirety.

Preferably, mineral oil softeners are used having the following characteristics:

| | |
|---|---|
| PCA content: | maximum 2.90 wt-% (according to IP 346) |
| Glass transition temperature | −58 ± 3° C. (according to ASTM E 1356) |
| Density at 15° C. | 907 kg/m³ (according to ASTM D 4502) |
| Pour point (freezing point) | 3° C. (according to ASTM D 97) |
| Viscosity at 40° C. | 200 ± 30 mm²/s (according to ASTM D 445) |
| Viscosity at 100° C. | 15 ± 2 mm²/s (according to ASTM D 445) |
| Refractive index at 20° C. | 1.500 ± 0.005 (according to ASTM D 2159) |
| Viscosity-density constant | 0.845 ± 0.020 (according to ASTM D 2140) |
| Sulfur content | 1.0 wt-% (according to ASTM D 2822) |
| Content of hydrocarbons | |
| Aromatic $C_A$: | 11–17% (according to ASTM D 2140) |
| Naphthenic $C_N$: | 25–32% (according to ASTM D 2140) |
| Paraffinic $C_P$: | 54–68% (according to ASTM D 2140) |
| Flame point: | at least 220° C. (according to ASTM D 92) |
| Water content: | 0.5% (according to ASTM D 6304-98a) |

The commercial product Catenex® SNR by Deutsche Shell AG can, for example, be used as a softener.

The rubber composition according to the invention includes at least a glyceride, an ester of glycerine, and/or a factice as another softener. It is preferred that environmentally friendly natural triglycerides of vegetable or animal origins to be used. Advantageously, inexpensive rapeseed oil is used, which can be processed particularly easily.

The sulfur cross-linkable rubber composition includes at least one diene elastomer. Diene elastomers include all rubbers having a chain of unsaturated carbons, at least partially derived from the conjugated dienes. It is particularly preferred for the diene elastomer or elastomers in the rubber composition to be selected from natural rubber, synthetic polyisoprene, polybutadiene and/or styrene-butadiene copolymer. Such diene elastomers can be easily processed into a rubber composition according to the invention and show no incompatibilities with the mineral oil softener and the rapeseed oil.

The styrene-butadiene copolymer can be a solution polymerized styrene-butadiene copolymer (S-SBR) having a styrene content of approximately 14 to 45 wt %, which can be produced, for example, using lithium alkylene in organic solutions. The use of S-SBR, for example in treads of tires having silica as a filler, has the advantage of reduced rolling resistance and heat build-up during dynamic alternating stress due to its lower hysteresis. However, emulsion polymerized styrene-butadiene copolymers (E-SBR) and compounds of E-SBR and S-SBR can be used. The styrene content of E-SBR is approximately 15 to 50 wt % and any type, including those known in the prior art, can be used that were produced by copolymerization of styrene and 1,3 butadiene in an aqueous emulsion. E-SBR in compounds may result in an improved processing compared to S-SBR.

When the rubber composition contains polybutadiene as a diene elastomer, it may be either a cis-1,4- or a vinyl-polybutadiene (40–90 mol % vinyl content). The use of cis-1,4 polybutadiene having a cis-1,4 content greater than 90 mol % is preferred, which can be produced, for example, using solution polymerization in the presence of catalysts of a type of rare earths. Such cis-1,4 polybutadiene have low glass temperatures positively affecting the rolling resistance, wear, and winter characteristics of, e.g., treads made therefrom.

Additionally, the rubber composition can include polyisoprene as a diene elastomer. Here, it can be either a cis-1,4 polyisoprene or a 3,4 polyisoprene. However, the use of cis-1,4 polyisoprenes, having a cis-1,4 content >90 mol %, is preferred. On the one hand, such a polyisoprene can be produced by a stereospecific polymerization in a solution having Ziegler Natta-catalysts or by using finely dispersed lithium alkylene. On the other hand, natural rubber is such a cis-1,4 polyisoprene with the cis-1,4 polyisoprene content in the natural rubber being larger than 99 mol %.

Natural rubber can improve the processing characteristics and the raw stiffness, manufacturing stickiness, notch resistance, and tear strength of the vulcanized product can be increased.

According to a preferred embodiment of the invention, the weight ratio of finely dispersed, precipitated silica to carbon black in the rubber composition is 1:1 to 20:1. Here, the compounds have a content of high silica and such compounds, when used for tire tread strips, provide advantages for rolling resistance and brakes using ABS.

According to the invention, basically any finely dispersed, precipitated silica can be used, such as silica that is commonly used for the production of rubber compositions, including that which can be considered known to one skilled in the art and operating in this field. Preferably, however, such silicas are used that have a nitrogen surface (BET-surface) (according to ISO 5794/Annex D) of 35 to 350 m²/g, preferably of 100 to 250 m²/g, a CTAB-surface (according to ASTM D 3765) of 30 to 350 m²/g, preferably of 100 to 250 m²/g, a pore volume (according to DIN 66133) of 0.2 to 3.4 mL/g, preferably of 0.7 to 1.7 mL/g, an average particle diameter of 10 to 150 μm, preferably 10 to 100 μm, and a DBP-value (according to ASTM D 2414) of 50 to 300 mL/100 g, preferably of 150 to 250 mL/100 g. Therefore, silicas can be used, for example such as the ones of the type VN3 (trade name) from the company Degussa as well as highly dispersed silicas, so-called HD-silicas, (e.g., Ultrasil 7000 from the company Degussa).

In order to improve the processability and for connecting the silica with rubber, organosilane coupling agents are commonly used in the rubber compositions. The silane coupling agents react with the silanol groups at the surfaces of the silicas during the mixing of the rubber and/or the rubber composition (in situ) or already prior to the addition of the silica to the rubber as a pretreatment (pre-modification). Here, any silane coupling agents, such as those known to one skilled in the art, can be used as silane coupling agents. Such coupling agents known from prior art are bi-functional organosilanes having at least an alkoxy, cycloalkoxy, or phenoxy group on the silicon atom as the separation group, and which are provided for additional functionalities with a group able to react chemically with the polymer after the fission, if necessary. The latter group can, for example, be the following chemical groups: —SCN, —SH, —NH₂ or —$S_x$ (where x=2–8). For example, 3-mercaptopropyltriethoxysilane, 3-thiocyanato-propyltrimethoxysilane, or 3,3'-bis(triethoxysilylpropyl) polysulfide having 2 to 8 sulfur atoms, such as 3,3'-bis (triethoxysilylpropyl)tetrasulfide (TESPT), the respective disulfide or even compounds of polysulfides with different contents of the various polysulfides may be used as silane coupling agents. Here, TESPT may be added as a compound having industrial carbon black (trade name X50S from the company Degussa), for example. The silane coupling agents are used in amounts of 0.2 to 30 weight parts, preferably 1 to 15 weight parts in relation to the 100 weight parts of silica, because then an optimal connection of the silica to the rubber or rubbers can occur.

Any carbon blacks, including those known to one skilled in the art, that have the following characteristics can be used in the rubber composition according to the invention:

Dibutylphthalate value (DBP value, according to ASTM D 2414) 90 to 200 mL/100 g, CTAB-value (according to ASTM D 3765) from 80 to 170 m$^2$/g, and iodine value from 10 to 250 g/kg (according to ASTM D 1510).

All fillers, including those known from the prior art, can be additionally mixed as fillers into the rubber composition according to the invention, including, for example, alumina, alumino silicate, chalk, starch, and magnesium oxide.

According to a preferred embodiment of the invention, the rubber composition includes 10 to 80 phr finely dispersed, precipitated silica and 1 to 60 phr carbon black.

Additionally, the rubber composition according to the invention may include common additives in usual weight proportions. Such additives are antioxidants, such as N-phenyl-N'-(1,3 dimethylbutyl)-p-phenylendiamine (6PPD), N-Isopropyl-N'-phenyl-p-phenylendiamine (IPPD), 2,2,4-trimethyl-1,2-dihydrochinoline (TMQ) and other substances, for example, known from J. Schnetger, Dictionary of Rubber Technology [Lexikon der Kautschuktechnik], 2$^{nd}$ Edition, Hüthig Buch Verlag, Heidelberg, 1991, pages 42–48, which is incorporated by reference herein in its entirety, activators, such as, for example, zinc white and fatty acids such as stearine acid, and waxes, and peptizers, such as, for example, 2.2' dibenzamidodiphenyldisulfide (DBD).

The vulcanization is performed in the presence of sulfur or sulfur donors, with some sulfur donors sometimes acting simultaneously as vulcanization accelerators. Sulfur and sulfur donors are added to the rubber composition during the final mixing step in amounts common for one skilled in the art, such as 0.4 to 4 phr, sulfur preferably in amounts between 1.5 to 2.5 phr.

Furthermore, the rubber composition may include substances that influence the vulcanization process, such as vulcanization accelerators, vulcanization decelerators, and vulcanization activators in the common amounts for the purpose of controlling the necessary duration and/or the temperature required for the vulcanization and to improve the vulcanization characteristics. For example, the vulcanization accelerators may be selected from the following accelerator groups: thiazol accelerators such as 2-mercapto benzothiazol, sulfenamide accelerators such as benzothiazyl-2-cyclohexylsulfenamide (CBS), guanidine accelerators such as N,N'-diphenyl guanidine (DPG), and dithiocarbamate accelerators such as zincdibenzyl dithiocarbamate, disulfide. The accelerators may also be used in combination with one another, sometimes resulting in synergetic effects.

The production of the rubber composition according to the invention occurs initially in one or more mixing steps by mixing at least a diene elastomer, finely dispersed, precipitated silica, carbon black, at least one mineral oil softener and at least one glyceride and/or one factice, at least one silane coupling agent, and the commonly used additives, except the vulcanization system (sulfur, and/or sulfur donors and accelerators) in a mixing apparatus, such as a mixing apparatus known to one skilled in the art, for example, in an internal mixer, at temperatures of up to 180° C. In this first mixing step, a temperature of at least 130° C. should be set, preferably a temperature of 145 to 170° C.

This process can be performed during the mixing such that the compound is initially heated to the desired temperature and is then cooled to a temperature below the vulcanization temperature. This cycle can be performed at least once and can, if necessary, be repeated several times.

The components of the compound can be processed into a homogenous compound quickly and without any problems. Subsequently, the additional mixing of the vulcanization system occurs at temperatures below the vulcanization temperature.

Then the rubber composition is processed further, e.g., by means of an extrusion process, and is formed into the appropriate shape, e.g., a green tire tread. A green tire tread produced in this manner is put on during the production of green tires, in particular, pneumatic vehicle green tires, in a known fashion.

Subsequent to the vulcanization, the resulting products (rubber products) have the advantage that black markings caused by friction and dark discoloration of surfaces due to extended contact of the product to such surfaces do not occur. The vulcanized rubber compositions can be used, e.g., in pneumatic vehicle tires, conveyor belts, driving belts, seals, hoses, and shoe soles. Simultaneously, the vulcanization products, e.g., tires, do not have any disadvantages in their physical characteristics compared to the products made from known rubber compositions. It is irrelevant for tires if the entire tread is made from a single compound or, e.g., is provided with a cap-and-base construction, because it is important for at least the surface contacting the road or a part of such a surface to be made from the rubber composition according to the invention.

EXAMPLES

The invention is illustrated in the following non-limiting examples, which are provided for the purpose of representation, and are not to be construed as limiting the scope of the invention. In particular, the invention is now explained in greater detail using some exemplary embodiments, as summarized in Tables 1 to 3, without being limited to these examples.

In all of the exemplary compounds included in Tables 1 to 3, the stated data of amounts are weight parts in relation to 100 weight parts of total rubber (phr).

The compounds marked 1(V), 4(V) and 7(V) are reference compounds having an aromatic process oil and carbon black. The compounds marked 2(V), 5(V) and 8(V) are reference compounds having an aromatic process oil and carbon black and silica. The compounds marked 3(E), 6(E) and 9(E) are compounds according to the present invention having a mineral oil softener with a content of polycyclic aromatic compositions of less than 3 wt-%, determined by the DMSO-extract according to the IP 346 method, in relation to the total weight of the mineral oil softeners, and a glass transition temperature below −45° C., and rapeseed oil and weight ratios of silica to carbon black between 1:2 to 20:1. The compounds 1 to 3, 4 to 6, and 7 to 9 form groups to be compared, with the separate examples of each group having the same polymer composition. The components of all compounds 1 through 9 could be easily processed into a homogenous compound.

Test bodies were produced from all compounds during a vulcanization in a press lasting 20 minutes at 160° C., and the material characteristics typical for the rubber industry were determined using these test bodies. The following testing procedures were used for examining the test bodies:

tensile strength at room temperature according to DIM 53 504 stress value 300% at room temperature according to DIN 53 504 elongation at tear at room temperature according to DIN 53 504 shore-A hardness at room temperature according to DIN 53 505 rebound resilience at room temperature according to DIN 53 512 wear according to DIN 53 516

Furthermore, the vulcanization test bodies were examined to determine if they cause undesired black markings when rubbed over a surface, e.g., when rubbed over high gloss paper, and if they leave stains on surfaces if contacting over an extended period of several days at room temperature (++ means: markings and stains were observed, + means: slight markings were observed, – means: no markings or stains were observed).

TABLE 1

| | Unit | 1(V) | 2(V) | 3(E) | 4(V) | 5(V) | 6(E) |
|---|---|---|---|---|---|---|---|
| Components | | | | | | | |
| natural rubber | phr | 80.0 | 80.0 | 80.0 | — | — | — |
| E-SBR$^a$ | phr | — | — | — | 80.0 | 80.0 | 80.0 |
| BR$^b$ | phr | — | — | — | 20.0 | 20.0 | 20.0 |
| S-SBR$^c$ | phr | 20.0 | 20.0 | 20.0 | — | — | — |
| carbon black N121 | phr | 55.0 | 5.0 | 5.0 | 70.0 | 5.5 | 5.5 |
| silica$^d$ | phr | — | 50.0 | 50.0 | — | 55.0 | 55.0 |
| aromatic processing oil$^e$ | phr | 22.0 | 22.0 | — | 32.0 | 32.0 | — |
| mineral oil softeners$^f$ | phr | — | — | 16.0 | — | — | 27.0 |
| rapeseed oil | phr | — | — | 6.0 | — | — | 5.0 |
| TESPT$^g$ | phr | — | 5.0 | 5.0 | — | 5.5 | 5.5 |
| zinc oxide | phr | 3.0 | 3.0 | 3.0 | 2.5 | 2.5 | 2.5 |
| stearine acid | phr | 1.0 | 1.0 | 1.0 | 1.0 | 1.0 | 1.0 |
| preservative IPPD | phr | 1.0 | 1.0 | 1.0 | 1.0 | 1.0 | 1.0 |
| paraffine wax | phr | 1.0 | 1.0 | 1.0 | 1.0 | 1.0 | 1.0 |
| DPG | phr | — | 1.2 | 1.2 | 0.4 | 0.6 | 0.6 |
| CBS | phr | 1.8 | 1.6 | 1.6 | 1.3 | 1.5 | 1.5 |
| sulfur | phr | 1.2 | 1.4 | 1.4 | 1.9 | 2.0 | 2.0 |
| Characteristics | | | | | | | |
| tensile strength at RT | N/mm$^2$ | 17.5 | 18.9 | 18.1 | 16.4 | 16.9 | 16.2 |
| stress value 300% | N/mm$^2$ | 8.2 | 8.3 | 8.5 | 6.2 | 6.3 | 6.5 |
| elongation at tear at RT | % | 480 | 470 | 469 | 460 | 465 | 459 |
| shore-A-hardness at RT | shore A | 64 | 64 | 65 | 62 | 63 | 63 |
| rebound resilience at RT | % | 42 | 41 | 42 | 34 | 33 | 35 |
| DIN wear | mm$^2$ | 119 | 125 | 126 | 96 | 105 | 101 |
| markings/tracks on the surface | | ++ | + | – | ++ | + | – |
| stains at contact with surface | | ++ | ++ | – | ++ | ++ | – |

TABLE 2

| | Unit | 7(V) | 8(V) | 9(E) |
|---|---|---|---|---|
| Components | | | | |
| natural rubber | phr | — | — | — |
| E-SBR$^a$ | phr | 100.0 | 100.0 | 100.0 |
| BR$^b$ | phr | — | — | — |
| S-SBR$^c$ | phr | — | — | — |
| carbon black N121 | phr | 75.0 | 6.0 | 6.0 |
| silica$^d$ | phr | — | 60.0 | 60.0 |
| aromatic processing oil$^e$ | phr | 34.0 | 34.0 | — |
| mineral oil softeners$^f$ | phr | — | — | 26.0 |
| rapeseed oil | phr | — | — | 8.0 |
| TESPT$^g$ | phr | — | 6.0 | 6.0 |
| zinc oxide | phr | 2.5 | 2.5 | 2.5 |
| stearine acid | phr | 1.0 | 1.0 | 1.0 |
| preservative IPPD | phr | 1.0 | 1.0 | 1.0 |
| paraffine wax | phr | 1.0 | 1.0 | 1.0 |
| DPG | phr | 0.2 | 0.8 | 0.8 |
| CBS | phr | 1.3 | 1.4 | 1.4 |
| sulfur | phr | 2.0 | 2.1 | 2.1 |
| Characteristics | | | | |
| tensile strength at RT | N/mm$^2$ | 14.5 | 14.3 | 14.2 |
| stress value 300% | N/mm$^2$ | 6.1 | 6.4 | 6.3 |
| elongation at tear at RT | % | 504 | 510 | 517 |
| store-A-hardness at RT | shore A | 63 | 62 | 64 |
| rebound resilience at RT | % | 29 | 28 | 30 |
| DIN wear | mm$^2$ | 110 | 107 | 109 |
| markings/tracks on surface | | ++ | + | – |
| stains at contact with surface | | ++ | ++ | – |

$^a$SBR 1500 Bayer AG, Germany
$^b$CB10, Bayer AG, Germany
$^c$Calprene 1204, Repsol, Spain
$^d$Ultrasil VN3, Degussa AG, Germany
$^e$Mobisol 30, Mobil, Great Britain
$^f$Catanex SNR, Shell AG, Germany
$^g$Si69, Degussa AG, Germany It is discernible from Tables 1 and 2 that, within the measurement accuracy, the vulcanized rubbers made from the rubber compositions according to the invention are not inferior in their physical characteristics to the reference compounds. However, the compounds 3, 6, and 9 do not cause any markings due to friction on the surface, in contrast to their reference compounds, and no stains after an extended contact with the surface. This is only achieved according to the invention in the combination of the special mineral oil softeners with rapeseed oil and the special ratio of silica to carbon black. The sole exchange of parts of the carbon black with silica, as shown in the examples 2, 5, and 8, do not attain the object of the invention.

If tire treads are produced from the compounds according to the invention the tires show no brake tracks, for example. Additionally, the tires can be stored or put onto light surfaces without any problems, not causing stains on the floor. The physical characteristics of the tire are not reduced in comparison to tires made from conventional compounds. In order to show the ladder, e.g., tire tests with pneumatic vehicle tires of the dimensions 185/85 R 14 Q and 175/70 R 13 Q were performed with their tread being produced from conventional compounds (tires 10 and 12) and from compounds according to the invention (tires 11 and 13). Table 3 shows the compound composition having the components to be compared and the tire results. The compounds include common chemicals for cross-linking and preservatives. The tire characteristics of tires having a tread made from conventional compounds were set at 100, values above 100 represent an improvement of the corresponding characteristic (rating).

TABLE 3

| | unit | Tire test | | | |
|---|---|---|---|---|---|
| | | 10 | 11 | 12 | 13 |
| | | Tire dimension | | | |
| | | 185/65 R 14 Q | 185/65 R 14 Q | 187/70 R 13 Q | 175/70 R 13 Q |
| Pneumatic tire composition | | | | | |
| natural rubber | phr | 70 | 70 | 66 | 66 |
| E-SBR[a] | phr | 15 | 15 | 18 | 18 |
| BR[b] | phr | 15 | 15 | 16 | 16 |
| carbon black N339 | phr | 65 | 60 | 58 | 58 |
| silica[d] | phr | 20 | 30 | 20 | 30 |
| aromatic process oil[e] | phr | 41.625 | — | 40.75 | — |
| mineral oil softeners[f] | phr | — | 41.625 | — | 40.75 |
| rapeseed oil | phr | 5 | 5 | 10 | 10 |
| TESPT | phr | 4 | 4 | 4 | 4 |
| characteristics from the tire test | | | | | |
| Braking (wet) using ABS | | 100 | 101 | 100 | 101 |
| rolling resistance | | 100 | 103 | 100 | 103 |
| winter characteristics | | 100 | 102 | 100 | 102 |

An improvement of the tire characteristics with respect to braking (wet) using ABS, rolling resistance, and winter characteristics could be determined in the tires with the compounds according to the invention, i.e., comprised of the special mineral oil softeners, the rapeseed oil, and the ratio of silica to carbon black claimed. Compared to the sole use of rapeseed oil, having an aromatic process oil and a weight ratio of silica to carbon black outside of the range of 1:2 to 20:1 according to the invention, the compounds according to the invention are therefore provided with additional advantages in their tire characteristics in addition to the avoidance of stains and markings due to friction.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

We claim:

1. A sulfur vulcanizable rubber composition which does not contain aromatic process oils, comprising:
   at least one diene elastomer;
   at least finely dispersed, precipitated silica and carbon black as fillers, said finely dispersed, precipitated silica and said carbon black being present in a weight ratio of silica to carbon black of 1:2 to 20:1;
   softeners including 5 to 60 phr of at least one mineral oil softener, comprising a content of polycyclic aromatic compositions of less than 3 wt-% in reference to the total weight of the at least one mineral oil softener, determined by DMSO extract according to IP 346 method, and a glass transition temperature less than −45° C., and 1–20 phr of at least one of at least one glyceride and at least one factice; and
   at least one silane coupling agent.

2. The rubber composition according to claim 1 wherein the at least one glyceride comprises rapeseed oil.

3. The rubber composition according to claim 1 wherein the at least one diene elastomer is selected from at least one of natural rubber, synthetic polyisoprene, polybutadiene, and styrene-butadiene-copolymers.

4. The rubber composition according to claim 2 wherein the at least one diene elastomer is selected from at least one of natural rubber, synthetic polyisoprene, polybutadiene, and styrene-butadiene-copolymers.

5. The rubber composition according to claim 1 wherein the weight ratio of finely dispersed, precipitated silica to carbon black is 1:1 to 20:1.

6. The rubber composition according to claim 2 wherein the weight ratio of finely dispersed, precipitated silica to carbon black is 1:1 to 20:1.

7. The rubber composition according to claim 3 wherein the weight ratio of finely dispersed, precipitated silica to carbon black is 1:1 to 20:1.

8. The rubber composition according to claim 1 wherein the finely dispersed silica has a nitrogen surface of 35 to 350 m$^2$/g and a pore volume of 0.2 to 3.4 mL/g.

9. The rubber composition according to claim 7 wherein the finely dispersed silica has a nitrogen surface of 35 to 350 m$^2$/g and a pore volume of 0.2 to 3.4 mL/g.

10. The rubber composition according to claim 1 wherein the at least one silane coupling agent is present in an amount of 0.2 to 30 parts per weight in relation to 100 parts per weight of silica.

11. The rubber composition according to claim 2 wherein the at least one silane coupling agent is present in an amount of 0.2 to 30 parts per weight in relation to 100 parts per weight of silica.

12. The rubber composition according to claim 3 wherein the at least one silane coupling agent is present in an amount of 0.2 to 30 parts per weight in relation to 100 parts per weight of silica.

13. The rubber composition according to claim 1 comprising 10 to 80 phr silica and 1 to 60 phr carbon black.

14. The rubber composition according to claim 2 comprising 10 to 80 phr silica and 1 to 60 phr carbon black.

15. The rubber composition according to claim 3 comprising 10 to 80 phr silica and 1 to 60 phr carbon black.

16. A process for producing a sulfur vulcanizable rubber composition which does not contain aromatic process oils, the rubber composition comprising:

at least one diene elastomer;

at least finely dispersed, precipitated silica and carbon black as fillers, the finely dispersed, precipitated silica and the carbon black being present in a weight ratio of silica to carbon black of 1:2 to 20:1;

softeners including 5 to 60 phr of at least one mineral oil softener, comprising a content of polycyclic aromatic compositions of less than 3 wt-% in reference to the total weight of the at least one mineral oil softener, determined by DMSO extract according to IP 346 method, and a glass transition temperature less than −45° C., and 1–20 phr of at least one of at least one glyceride and at least one factice; and at least one silane coupling agent;

the process comprising:

(a) mixing the at least one diene elastomer, the finely dispersed, precipitated silica, the carbon black, the at least one mineral oil softener, and the at least one of at least one glyceride and at least one factice, and the at least one silane coupling agent, in the absence of a vulcanization system, and, simultaneously, heating the composition to a temperature of up to 180° C.; and (b) adding and mixing a vulcanization system at a temperature below the vulcanization temperature.

17. The process according to claim 16 wherein the mixing of (a) includes at least one heating and cooling cycle.

18. A rubber product composed of the rubber composition of claim 1 vulcanized with sulfur.

19. The rubber product according to claim 1 comprising a tread strip of a tire.

20. A tire including a tread strip, said tire at least partially composed of a rubber composition of claim 1 vulcanized with sulfur.

21. The tire according to claim 20 wherein said tread strip is at least partially composed of the rubber composition.

* * * * *